United States Patent
Yang et al.

(10) Patent No.: US 8,311,037 B2
(45) Date of Patent: Nov. 13, 2012

(54) METHOD, APPARATUS AND SYSTEM FOR TRANSMITTING USER EQUIPMENT INFORMATION IN A MULTIMEDIA SUBSYSTEM

(75) Inventors: Lili Yang, Shenzhen (CN); Henliang Zhang, Shenzhen (CN); Peili Xu, Shenzhen (CN); Peng Zhao, Shenzhen (CN); Peng Wang, Shenzhen (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 706 days.

(21) Appl. No.: 12/475,856

(22) Filed: Jun. 1, 2009

(65) Prior Publication Data

US 2010/0182997 A1    Jul. 22, 2010

Related U.S. Application Data

(63) Continuation of application No. PCT/CN2007/071273, filed on Dec. 19, 2007.

(30) Foreign Application Priority Data

Jan. 19, 2007    (CN) .......................... 2007 1 0001191

(51) Int. Cl.
    *H04L 12/66* (2006.01)
(52) U.S. Cl. ..................................... 370/352
(58) Field of Classification Search .......... None
    See application file for complete search history.

(56) References Cited

U.S. PATENT DOCUMENTS

| 2005/0059384 A1* | 3/2005 | Kuusinen et al. ........... 455/414.1 |
| 2005/0170861 A1 | 8/2005 | Niemi et al. |
| 2005/0255811 A1* | 11/2005 | Allen et al. ..................... 455/78 |
| 2006/0092970 A1 | 5/2006 | Song et al. |
| 2006/0148522 A1 | 7/2006 | Chipchase et al. |
| 2006/0270404 A1 | 11/2006 | Tuohino et al. |

FOREIGN PATENT DOCUMENTS

| CN | 1663216 A | 8/2005 |
| CN | 1805452 A | 7/2006 |
| CN | 1885859 A | 12/2006 |
| CN | 101115059 A | 1/2008 |

OTHER PUBLICATIONS

Reexamination Decision of Chinese Application No. 200710001191.3, mailed by the Chinese Patent Office on Feb. 25, 2011.

(Continued)

*Primary Examiner* — Yong Zhou
(74) *Attorney, Agent, or Firm* — Finnegan, Henderson, Farabow, Garrett & Dunner, LLP

(57) ABSTRACT

The present disclosure discloses a method, apparatus and system for transmitting UE information in a multimedia subsystem. The method includes: a call session control function entity obtains capability information of UE, and transmits the capability information of the UE to an AS; the AS obtaining the capability information of the UE sent from the call session control function entity. The solution of the present disclosure ensures that the AS in the IMS can obtain the capability information of the UE. Therefore, services based on the capability information of the UE can be implemented on the AS successfully.

4 Claims, 4 Drawing Sheets

OTHER PUBLICATIONS

First Chinese Office Action dated (mailed) May 16, 2008, issued in related Chinese Application No. 200710001191.3 Huawei Technologies C., Ltd.

Second Chinese Office Action dated (mailed) May 22, 2009, issued in related Chinese Application No. 200710001191.3 Huawei Technologies C., Ltd.

CN 20100920; Notification of Re-examination of Chinese Application No. 200710001191.3, Sep. 20, 2010.

Extended European Search Report dated (mailed) Apr. 9, 2010, issued in related Application No. 07846099.5-1244/2106156, filed Dec. 19, 2007, Huawei Technologies Co., Ltd.

Written Opinion of the International Searching Authority (translation) dated (mailed) Apr. 30, 200808, issued in related Application No. PCT/CN2007/0712373, filed Dec. 19, 2007, Huawei Technologies Co., Ltd.

3GPP TS 24.229 V7.6.0 (Dec. 2006) 3rd Generation Partnership Project; Technical Specification Group Core Network and Terminals; IP multimedia call control protocol based on Session Initiation Protocol (SIP) and Session Description Protocol (SDP); Stage 3; Global System for Mobile Communications 3GPP.

Rosenberg, J. et al, "Indicating User Agent Capabilities in the Session Initiation Protocol (SIP)," Network Working Group, Request for Comments: 3840, Category: Standards Track, Aug. 2004.

Sparks, R., "Internet Media Type message/sipfrag," Network Working Group, Request for Comments: 3420, Category: Standards Track, Nov. 2002.

European Patent Office Communication pursuant to Article 94(3) EPC for European Application No. 07846099.5, mailed Aug. 19, 2011, Huawei Technologies Co., Ltd.

3GPP TS 23.228 V7.6.0 (Dec. 2006); $3^{rd}$ Generation Partnership Project; Technical Specification Group Services and System Aspects; IP Multimedia Subsystem (IMS); Stage 2 (Release 7); 3GPP; XP 50363300A, 5 pages.

Niemi, Aki et al., English abstract of WO 03107621A1, which is the international equivalent of CN1663216A, for "A method and system to subscription of events using SIP protocol," 1 page, Aug. 31, 2005.

Office Action in the corresponding Chinese application No. 200710001191.3, mailed by the Chinese Patent Office on May 16, 2008.

International Search Report from P.R. China in International Application No. PCT/CN2007/071273 mailed Apr. 3, 2008.

* cited by examiner

METHOD, APPARATUS AND SYSTEM FOR TRANSMITTING USER EQUIPMENT INFORMATION IN A MULTIMEDIA SUBSYSTEM

CROSS REFERENCE TO RELATED APPLICATIONS

This application is a continuation of International Application No. PCT/CN2007/071273, filed on Dec. 19, 2007, titled "METHOD, APPARATUS AND SYSTEM FOR TRANSMITTING UE INFORMATION IN MULTIMEDIA SUBSYSTEM," which claims the priority of Chinese Patent Application No. 200710001191.3, filed Jan. 19, 2007, and entitled "METHOD, APPARATUS AND SYSTEM FOR TRANSMITTING USER EQUIPMENT INFORMATION IN A MULTIMEDIA SUBSYSTEM," both of which are incorporated herein by reference in their entirety.

FIELD OF THE DISCLOSURE

The present disclosure relates to communication technologies, and more particularly, to a method, apparatus and system for transmitting User Equipment (UE) information in a multimedia subsystem.

BACKGROUND OF THE DISCLOSURE

An IP Multimedia Subsystem (IMS) is a network capable of providing packet voices, packet data, uniform multimedia services and applications. In the IMS, an IP packet-switched domain is used as bearing channels for control signalling and media transmission. The control signalling is a call control signalling based on the Session Initial Protocol (SIP).

The IMS mainly includes the following functional entities: a Home Subscriber Server (HSS) configured to manage user subscription data of the IMS; an Application Server (AS) configured to provide services; and a Serving-Call Session Control Function (S-CSCF) entity configured to implement session control function.

The AS and the S-CSCF are two separate functional entities in the IMS. The AS processes the IMS services triggered by the S-CSCF. Multiple as can cooperate with each other to provide a specific service.

In the IMS, an IMS user accesses the IMS through a Proxy-Call Session Control Function (P-CSCF) entity in a network where the IMS user is currently located. The session and service control functions are implemented by a home serving-CSCF (S-CSCF) entity in a network where the IMS user is registered. As a result, the IMS user can obtain the same service at different access points. Thus, the separation of service management, session control and bearing access is realized, and the access procedure is irrelevant to the position of the IMS user.

When accessing the IMS, the IMS user needs to establish a relationship between the IP address currently used by the IMS user and a public identity of the IMS user, i.e., the IMS user needs to register on the S-CSCF and the AS, so as to establish the relationship which is required during the service implementation. The registration of the IMS user on the AS is implemented by generating a third party REGISTER request by the S-CSCF and sending the third party REGISTER request to the AS. The registration procedure is as shown in FIG. 1 and includes the following steps.

Step 11: A UE initiates a REGISTER request to the S-CSCF. The contents contained in the REGISTER request include, for example:

"REGISTER sip: scscf.home.net SIP/2.0
Via: SIP/2.0/UDP [5555::aaa:bbb:ccc:ddd]; branch=z9hG4bKnashds7
Max-Forwards: 70
From:<sip:zhangsan@home.fr>;tag=6fa
To:<sip:zhangsan@home.fr>
Contact:<sip: [5555::aaa:bbb:ccc:ddd]>;expires=600000;
g.3gpp.cs-video; g.3gpp.voice
......".

Step 12: After receiving the REGISTER request sent by the UE, the S-CSCF returns a 200 OK response message to the UE indicating that the registration is successful.

Step 13: After receiving the REGISTER request, the S-CSCF checks the downloaded initial filtering criteria (iFC) of the user and evaluates the iFC.

Step 14: The S-CSCF generates a third party REGISTER request based on the iFC and sends the third party REGISTER request to the AS.

The contents contained in the third party REGISTER request includes, for example:

"REGISTER sip: as.home.net SIP/2.0
Via: SIP/2.0/UDP scscf.home.fr; branch=z9hG4bKnasctb9
Max-Forwards: 70
From:<sip:scscf@home.fr>;tag=7ec
To:<sip:zhangsan@home.fr>
Contact: <sip: scscf.home.fr>; expires=600000
......".

Step 15: After receiving the third party REGISTER request, the AS returns a 200 OK response message to the S-CSCF indicating that the user has successfully registered on the S-CS CF.

During the implementation of the present disclosure, in the above process, the S-CSCF initiates the registration to the AS for the user. In order to ensure that the AS is able to communicate with the S-CSCF during the registration to the AS instead of routing information destined to the UE directly to the UE, the S-CSCF replaces the UE information (i.e. capability information of the UE) in the Contact header field of the third party REGISTER request with the address of the S-CSCF. Thus, the AS is unable to obtain the UE information and, as a result, services based on the capability information of the UE cannot be successfully implemented on the AS.

SUMMARY OF THE DISCLOSURE

Embodiments of the present disclosure provide a method, apparatus and system for transmitting UE information in a multimedia subsystem, so as to ensure that an AS can obtain capability information of the UE, and further ensure that services based on the capability information of the UE can be successfully implemented on the AS.

According to an embodiment of the present disclosure, the method for transmitting UE information in a multimedia subsystem includes: obtaining, by a call session control function entity, capability information of a UE; transmitting the capability information of the UE to an Application Server (AS); and obtaining, by the AS, the capability information of the UE sent from the call session control function entity.

According to another embodiment of the present disclosure, a call session control function entity includes: a capability information obtaining unit configured to obtain capability information of User Equipment (UE) from a message sent from the UE; and a capability information transmitting unit configured to receive the capability information of the UE from the capability information obtaining unit and transmit the capability information of the UE to an Application Server (AS).

According to another embodiment of the present disclosure, a system for transmitting UE information in a multimedia subsystem includes: a call session control function entity configured to obtain capability information of UE from a message sent by the UE; and an Application Server (AS) configured to obtain the capability information of the UE sent from the call session control function entity.

It can be seen from the embodiments of the present disclosure that the S-CSCF can transmit the obtained capability information of the UE to the AS. Therefore, the AS in the IMS can obtain the capability information of the UE. Thus, services based on the capability information of the UE can be successfully implemented on the AS.

DETAILED DESCRIPTION OF THE EMBODIMENTS

Figure 1:
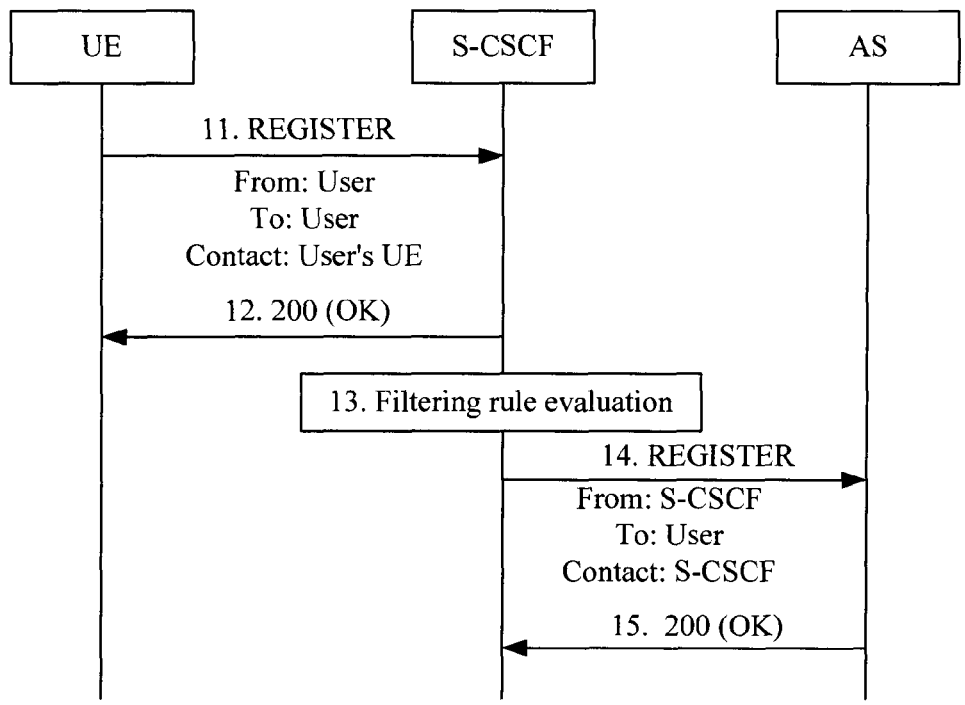
FIG. 1 is a schematic diagram illustrating a process of UE initiating registration in the related art.

In one embodiment, the method for transmitting UE information in a multimedia subsystem provided by embodiments of the present disclosure primarily includes the following: the CSCF obtains capability information of the UE, i.e. characteristic information of the UE such as video capability, audio capability, text capability, software and software edition supported by the UE, etc.; and the CSCF transmits the capability information of the UE to the AS. In this way, the AS can receive and obtain the capability information of the UE, thereby triggering services based on the capability information of the UE.

In the embodiments of the present disclosure, the capability information of the UE can be obtained and transmitted to the AS by an S-CSCF of the UE. The capability information of the UE can be obtained by the S-CSCF through any one of the following manners:

(1) the S-CSCF obtains the capability information of the UE from a Contact header field of a REGISTER request sent by the UE;

(2) the S-CSCF obtains the capability information of the UE from a service request sent by the UE; and (3) the S-CSCF obtains the capability information of the UE from a capability information notification report sent by the UE, i.e., the UE reports the capability information of the UE to the S-CSCF through a special message for reporting the capability information of the UE.

In some embodiments, the S-CSCF can also obtain the characteristic information of the UE from header fields or message bodies of other messages received by the S-CSCF, and transmit the characteristic information as the capability information of the UE to the AS. For example, the S-CSCF obtains the characteristic information of the UE from feature-tags of other messages.

In embodiments of the present disclosure, the capability information of the UE can be sent to the AS through a third party REGISTER request or through other messages exchanged between the S-CSCF and the AS. For example, the capability information of the UE can be contained in a NOTIFY message sent from the S-CSCF to the AS and transmitted to the AS. Specifically, the capability information of the UE can be contained in the NOTIFY message by extending an event package, e.g., a registration event package, of the NOTIFY message. The capability information of the UE can also be contained in other messages exchanged between the S-CSCF and the AS.

The detailed embodiments of the present disclosure will be explained hereinafter by taking an example in which the capability information of the UE is obtained during a registration procedure. However, the embodiments are not limited to the registration procedure.

In the embodiments of the present disclosure, information in the Contact header field of the REGISTER request sent by the UE, e.g. information indicating Combining CS and IMS Services (CSI) capability of the UE, will not be discarded any more during the registration procedure initiated by the S-CSCF representing the UE. Thus, the AS can receive the complete UE information, based on which the AS will trigger a related operation, e.g. performing subscription.

In the IMS, the method for avoiding loss of the UE information during the third party registration procedure provided by the embodiments of the present disclosure includes:

First, after receiving the REGISTER request of the UE, the S-CSCF extracts information contained in the Contact header field of the REGISTER request. The information contained in the Contact header field includes, but is not limited to, a feature tag, a Globally Routable User Agent URI (GRUU), etc.

Then, after extracting the information, the S-CSCF generates a third party REGISTER request and sends the third party REGISTER request to the AS to initiate the third party registration for the UE. The third party REGISTER request contains the capability information of the UE extracted earlier.

Specifically, the capability information of the UE can be conveyed by using any one of the following two methods.

(1) The extracted capability information of the UE is contained in the Contact header field of the third party REGISTER request sent to a third party. Meanwhile, the Contact header field can also contain the address information of the S-CSCF. Thus, the AS can obtain the capability information of the UE and the address information of the S-CSCF at the same time.

(2) The extracted capability information of the UE is contained in an Accept-Contact header field of the third party REGISTER request sent to the third party. Meanwhile, the Contact header field of the third party REGISTER request can also contain the address information of the S-CSCF.

In embodiments of the present disclosure, instead of the above operation of extracting information, the S-CSCF can insert a Path header field in the REGISTER request of the UE and add the address information of the S-CSCF in the Path header field. Then, the S-CSCF transmits the third party REGISTER request, including the Path header field, to the AS. After receiving the third party REGISTER request, the AS stores the address information of the S-CSCF contained in the Path header field. In this way, the AS can route information destined for the UE to the S-CSCF. In other embodiments, the whole content of the field containing the capability information of the UE in the message received by the S-CSCF is included in the third party REGISTER request, e.g., the S-CSCF generates a message field or a sipfrag (SIP part) field in the third party REGISTER request to contain the capability information of the UE in the REGISTER request sent by the UE, and the address of the S-CSCF is contained in the Contact header field of the third party REGISTER request.

In addition, in the embodiments of the present disclosure, the capability information of the UE can be transmitted through other messages exchanged between the S-CSCF and the AS, e.g., a NOTIFY message.

It can be seen from the above embodiment that the capability information of the UE can be obtained by the AS so that corresponding services can be implemented based on the capability information of the UE. Meanwhile, the address information of the S-CSCF can also be obtained by the AS, so that the AS is able to route information destined to the UE to the S-CSCF first, and the S-CSCF transmits the information to the UE.

The embodiments of the present disclosure will be illustrated in detail hereinafter with reference to the accompanying drawings to make the subject-matter therein better understood.

A First Embodiment

Figure 2:
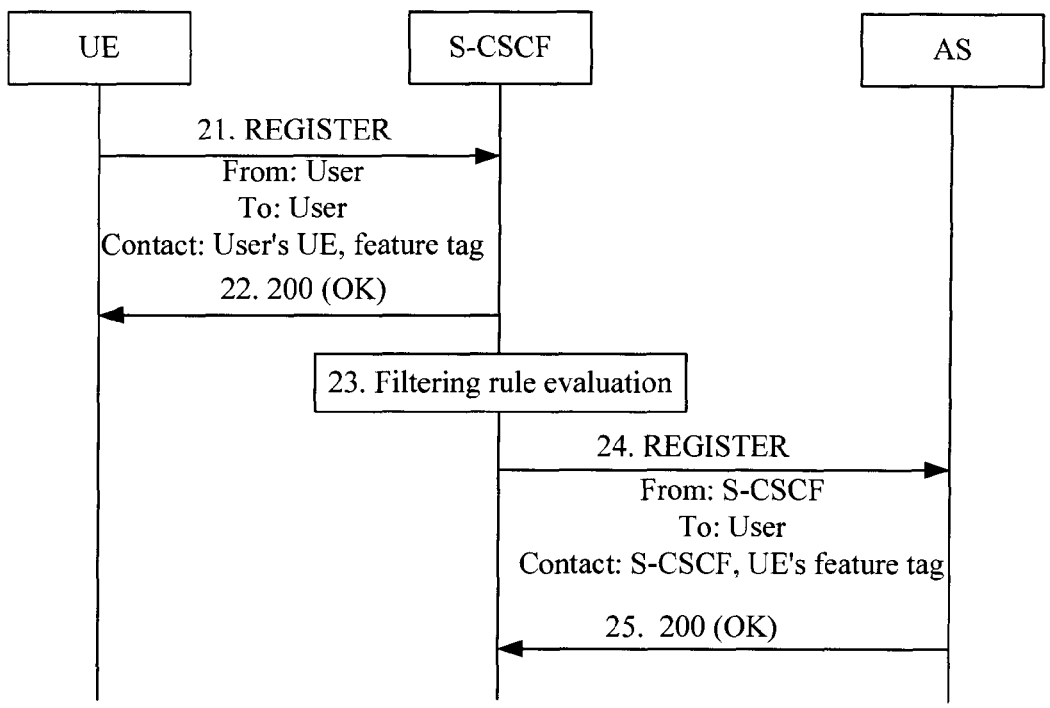
FIG. 2 is a schematic diagram illustrating a first embodiment of the present disclosure.

In the first embodiment, the S-CSCF adds the capability information of the UE in the Contact header field of the third party REGISTER request sent to a third party. The process of the first embodiment is shown in FIG. 2 and includes the following steps.

Step 21: The UE initiates a REGISTER request to the S-CSCF.

In this example, a content contained in the REGISTER request includes the following:

```
"REGISTER sip: scscf.home.net SIP/2.0
Via: SIP/2.0/UDP [5555::aaa:bbb:ccc:ddd]; branch=z9hG4bKnashds7
Max-Forwards:70
From:<sip:zhangsan@home.fr>;tag=6fa
To:<sip:zhangsan@home.fr>
Contact:<sip:    [5555::aaa:bbb:ccc:ddd]>;expires=600000;
g.3gpp.cs-video;    g.3gpp.cs-voice
 ......"
```

Step 22: After receiving the REGISTER request from the UE, the S-CSCF extracts the capability information of the UE contained in the Contact header field of the REGISTER request, and returns a 200 OK response message indicating that the registration to the UE is successful.

Step 23: The S-CSCF checks the downloaded iFC of the user and evaluates the iFC.

Step 24: The S-CSCF generates a third party REGISTER request based on the iFC and sends the generated third party REGISTER request to the AS. The Contact header field of the third party REGISTER request contains the capability information extracted in Step 22.

Referring to the content contained in the REGISTER request in Step 21, the content contained in the third party REGISTER request can be as follows:

```
"REGISTER sip: as.home.net SIP/2.0
Via:SIP/2.0/UDP scscf.home.fr; branch=z9hG4bKnasctb9
```

```
Max-Forwards:70
From:<sip:scscf@home.fr>;tag=7ec
To:<sip:zhangsan@home.fr>
Contact:<sip: scscf.home.fr>;expires=600000; g.3gpp.cs-video;
g.3gpp.cs-voice
 ......"
```

Step 25: After receiving the third party REGISTER request, the AS returns a 200 OK response message indicating that the registration to the S-CSCF is successful, i.e., after receiving the capability information of the UE, the AS regards the user as being successfully registered on the S-CSCF.

After the above procedure, services based on the capability information of the UE can be implemented on the AS according to the capability information of the UE. Meanwhile, since the address information of the S-CSCF is also obtained by the AS, the AS is able to route the information destined to the UE to the S-CSCF first, and then the S-CSCF sends the information to the UE.

A Second Embodiment

Figure 3:
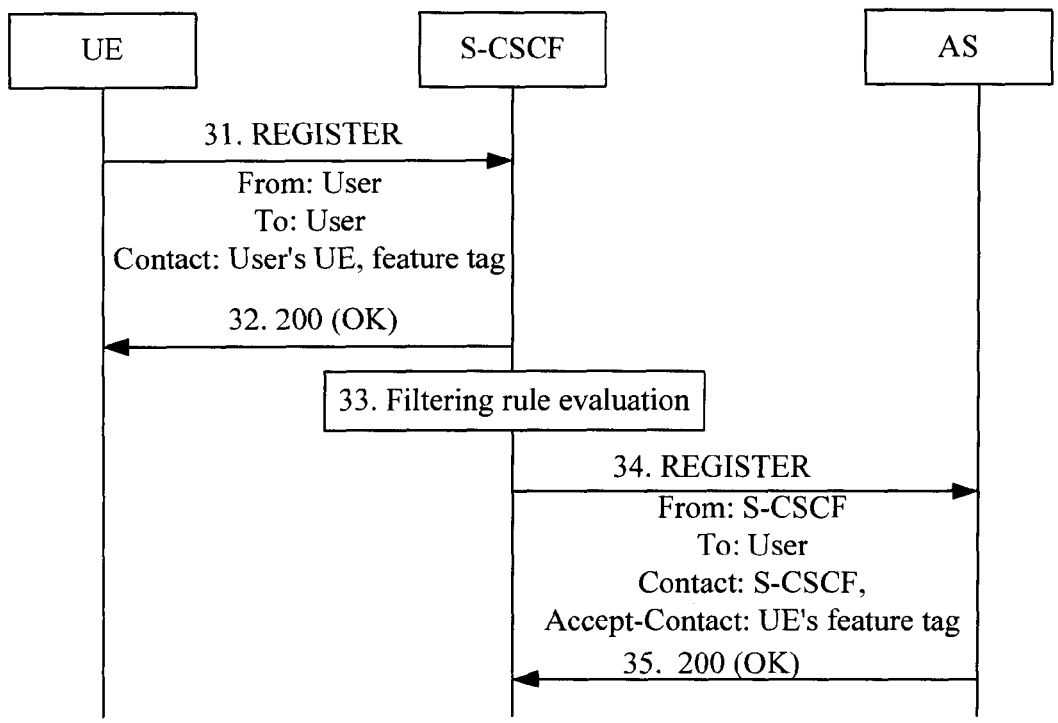
FIG. 3 is a schematic diagram illustrating a second embodiment of the present disclosure.

In the second embodiment, the S-CSCF adds the UE information in the Accept-Contact header field of the third party REGISTER request. The process of the second embodiment is shown in FIG. 3 and includes the following steps.

Step 31: The UE initiates a REGISTER request to the S-CSCF.

In this example, the content contained in the REGISTER request includes the following:

```
"REGISTER sip: scscf.home.net SIP/2.0
Via: SIP/2.0/UDP [5555::aaa:bbb:ccc:ddd]; branch=z9hG4bKnashds7
Max-Forwards:70
From:<sip:zhangsan@home.fr>;tag=6fa
To:<sip:zhangsan@home.fr>
Contact:<sip:    [5555::aaa:bbb:ccc:ddd]>;expires=600000;
g.3gpp.cs-    video;    g.3gpp.cs-voice
 ......"
```

Step 32: After receiving the REGISTER request from the UE, the S-CSCF extracts the capability information of the UE contained in the Contact header field of the REGISTER request, and returns a 200 OK response message indicating that the registration to the UE is successful.

Step 33: The S-CSCF checks a downloaded iFC of the user and evaluates the iFC.

Step 34: The S-CSCF generates a third party REGISTER request based on the iFC and sends the generated third party REGISTER request to the AS. The Accept-Contact header field of the third party REGISTER request contains the capability information extracted in Step 32.

Still referring to the content contained in the REGISTER request in Step 31, the content contained in the third party REGISTER request can be as follows:

```
"REGISTER sip: as.home.net SIP/2.0
Via: SIP/2.0/UDP scscf.home.fr; branch=z9hG4bKnasctb9
Max-Forwards:70
From:<sip:scscf@home.fr>;tag=7ec
To:<sip:zhangsan@home.fr>
Contact:<sip: scscf.home.fr>;expires=600000;
Accept-Contact: g.3gpp.cs- video; g.3gpp.cs-voice
 ......"
```

Step 35: The AS returns a 200 OK response message indicating that the registration to the S-CSCF is successful, i.e., after receiving the capability information of the UE, the AS regards the user as being successfully registered on the S-CSCF.

After the above procedure, services based on the capability information of the UE can be implemented on the AS according to the capability information of the UE. Meanwhile, since the address information of the S-CSCF is also obtained by the AS, the AS is able to route the information destined to the UE to the S-CSCF first, and then the S-CSCF sends the information to the UE.

A Third Embodiment

In the third embodiment, the S-CSCF generates a message/sipfrag part in the third party REGISTER request to contain the capability information of the UE. This part can also be referred to by other names and is not limited to message/sipfrag. Specifically, the S-CSCF adds a field in the third party REGISTER request to contain the information of the whole Contact header field in the REGISTER request sent by the UE.

Figure 4:
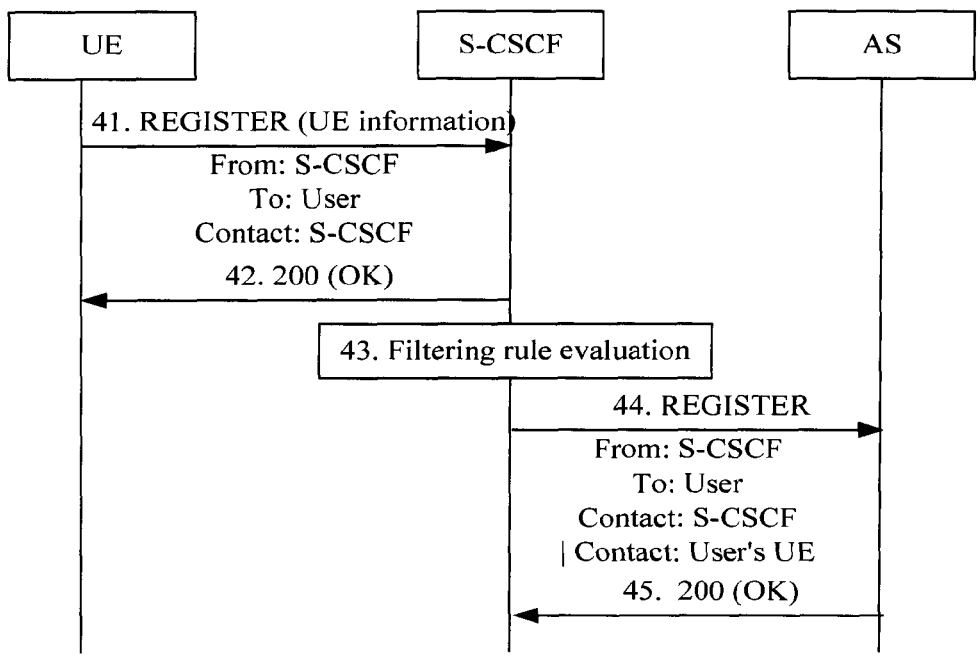
FIG. 4 is a schematic diagram illustrating a third embodiment of the present disclosure.

The procedure of the third embodiment is shown in FIG. 4 and includes the following steps.

Step 41: The UE initiates a REGISTER request to the S-CSCF.

In this example, the content contained by the REGISTER request includes the following:

```
"REGISTER sip: scscf.home.net SIP/2.0
Via: SIP/2.0/UDP [5555::aaa:bbb:ccc:ddd]; branch=z9hG4bKnashds7
Max-Forwards:70
From:<sip:zhangsan@home.fr>;tag=6fa
To:<sip:zhangsan@home.fr>
Contact:<sip: [5555::aaa:bbb:ccc:ddd]>;expires=600000;3gpp.cs-voice; g.3gpp.cs-video; g.3gpp.cs-voice
......"
```

Step 42: After receiving the REGISTER request, the S-CSCF extracts information contained in the Contact header field, and returns a 200 OK response message indicating that the registration succeeds to the UE.

Step 43: The S-CSCF checks a downloaded iFC of the user and evaluates the iFC.

Step 44: The S-CSCF generates a third party REGISTER request based on the iFC and sends the generated third party REGISTER request to the AS. The third party REGISTER request includes a sipfrag part containing the capability information. The sipfrag part can include "|Contact:" which means that the content in the sipfrag part is the information of the whole Contact header field in the REGISTER request sent by the UE.

Still referring to the content contained by the REGISTER request in Step 41, the content contained by the third party REGISTER request can be as follows:

```
"REGISTER sip: as.home.net SIP/2.0
Via:SIP/2.0/UDP scscf.home.fr; branch=z9hG4bKnasctb9
Max-Forwards:70
From:<sip:scscf@home.fr>;tag=7ec
To:<sip:zhangsan@home.fr>
Contact:<sip: scscf.home.fr>;expires=600000
Content-type: application/sipfrag
```
```
|Contact:<sip:[5555::aaa:bbb:ccc:ddd]>;expires=600000;
g.3gpp.cs-   video; g.3gpp.cs- voice
......"
```

Step 45: After receiving the third party REGISTER request, the AS returns a 200 OK response message indicating that the registration to the S-CSCF is successful, i.e., after receiving the capability information of the UE, the AS regards the user as being successfully registered on the S-CSCF.

A Fourth Embodiment

In the fourth embodiment, in order to ensure that the AS can receive the entire capability information of the UE during the third part registration and the S-CSCF is in the routing path, the S-CSCF can add a Path header field for storing the address of the S-CSCF in the REGISTER request of the UE during the process of initiating the third party registration to the AS based on the iFC. Thus, after receiving the REGISTER request from the S-CSCF, the AS is able to determine the path of the S-CSCF according to the Path header field in the REGISTER request. Meanwhile, the AS can obtain the capability information of the UE according to the information contained in the REGISTER request.

Figure 5:
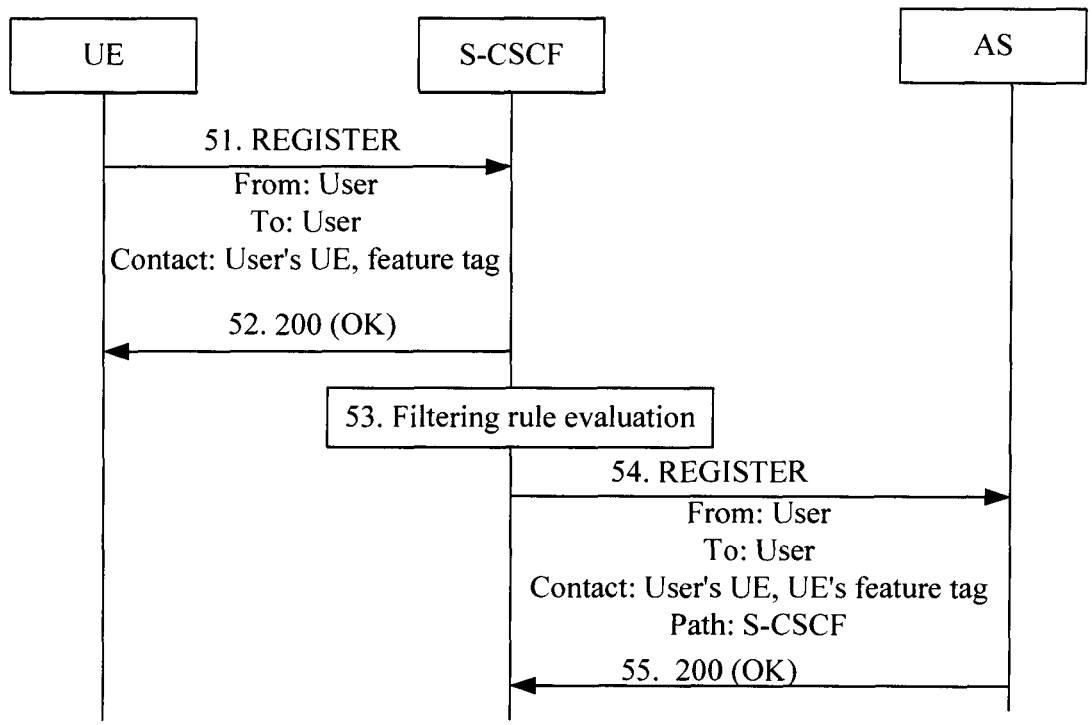
FIG. 5 is a schematic diagram illustrating a fourth embodiment of the present disclosure.

The procedure of the fourth embodiment is shown in FIG. 5 and includes the following steps.

Step 51: The UE initiates a REGISTER request to the S-CSCF.

In this example, the content contained in the REGISTER request includes the following:

```
"REGISTER sip: scscf.home.net SIP/2.0
Via: SIP/2.0/UDP [5555::aaa:bbb:ccc:ddd]; branch=z9hG4bKnashds7
Max-Forwards:70
From:<sip:zhangsan@home.fr>;tag=6fa
To:<sip:zhangsan@home.fr>
Contact:<sip:   [5555::aaa:bbb:ccc:ddd]>;expires=600000;
g.3gpp.cs-   video;   g.3gpp.cs-voice
......"
```

Step 52: After receiving the REGISTER request, the S-CSCF returns a 200 OK response message indicating that the registration to the UE is successful.

Step 53: The S-CSCF checks a downloaded iFC of the user and evaluates the iFC.

Step 54: The S-CSCF generates a third party REGISTER request based on the iFC, i.e., adds a Path header field for storing the address information of the S-CSCF in the REGISTER request sent by the UE, so that the AS can obtain the address information of the S-CSCF.

Still referring to the content contained in the REGISTER request in Step 51, the content contained in the third party REGISTER request can be as follows:

```
"REGISTER sip: as.home.net SIP/2.0
Via:SIP/2.0/UDP [5555::aaa:bbb:ccc:ddd]; branch=z9hG4bKnashds7
Via:SIP/2.0/UDP scscf.home.fr; branch=z9hG4bKnasctb9
Max-Forwards:69
From:<sip:zhangsan@home.fr>;tag=6fa
To:<sip:zhangsan@home.fr>
Contact:<sip:   [5555::aaa:bbb:ccc:ddd]>;expires=600000;
g.3gpp.cs-   video;   g.3gpp.cs-voice
Path:sip:scscf.home.fr
......"
```

Step 55: The AS returns a 200 OK response message indicating that the registration to the S-CSCF is successful, i.e., after receiving the capability information of the UE, the AS regards the user as being successfully registered on the S-CSCF.

Furthermore, the AS needs to store the address information of the S-CSCF contained in the Path header field locally, so that the AS can add a Route header field when receiving a request destined to the UE, thereby being able to transmit the corresponding request to the UE through the S-CSCF. The content in the Route header field is the address of the S-CSCF.

A Fifth Embodiment

In the fifth embodiment, the S-CSCF transmits the capability information of the UE through a NOTIFY message.

Figure 6:
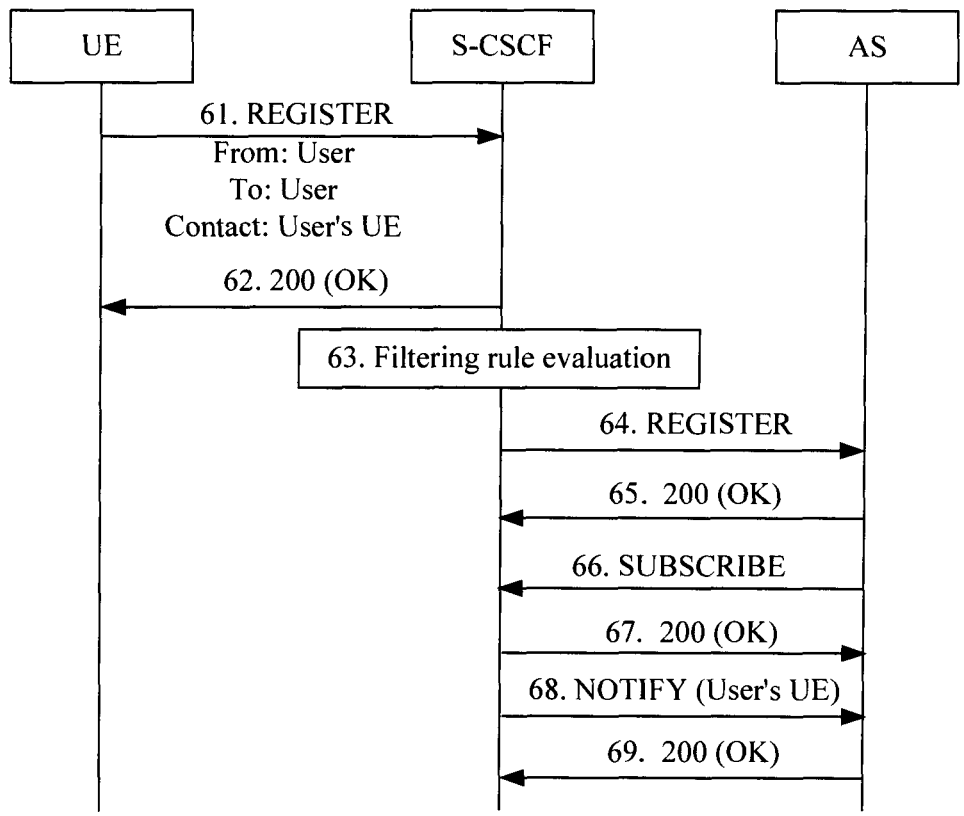
FIG. 6 is a schematic diagram illustrating a fifth embodiment of the present disclosure.

As shown in FIG. 6, the procedure of the fifth embodiment includes the following steps.

Step 61: The UE initiates a REGISTER request to the S-CSCF.

In this example, the content contained in the REGISTER request sent by the UE to the S-CSCF includes the following:

```
"REGISTER sip: scscf.home.net SIP/2.0
Via:SIP/2.0/UDP [5555::aaa:bbb:ccc:ddd]; branch=z9hG4bKnashds7
Max-Forwards:70
From:<sip:zhangsan@home.fr>;tag=6fa
To:<sip:zhangsan@home.fr>
Contact:<sip:[5555::aaa:bbb:ccc:ddd]>;expires=600000;
g.3gpp.cs-    video;    g.3gpp.cs- voice
......"
```

Step 62: After receiving the REGISTER request, the S-CSCF returns a 200 OK response message indicating that the registration succeeds to the UE.

Step 63: After receiving the REGISTER request, the S-CSCF checks a downloaded iFC of the user and evaluates the UE based on the iFC.

Step 64: If it is determined that the S-CSCF needs to initiate a registration process for the UE according to an evaluation result, the S-CSCF generates a third party REGISTER request and sends the generated third party REGISTER request to the AS.

Step 65: After receiving the third party REGISTER request, the AS returns a 200 OK response message indicating that the registration to the S-CSCF is successful. At this time, the AS regards the user as being successfully registered on the S-CSCF.

Step 66: The AS sends a SUBSCRBE request to the S-CSCF, requesting the S-CSCF to report information through a NOTIFY message.

Step 67: After receiving the SUBSCRIBE request, the S-CSCF returns a 200 OK response message indicating that the subscription to the AS is successful.

Step 68: The S-CSCF extends a registration event packet in the NOTIFY message to contain the capability information of the UE in the NOTIFY message and transmit the NOTIFY message to the AS.

Still referring to the content contained in the REGISTER request in Step 61, an xml file contained in the NOTIFY message can include the following:

```
"<?xml version="1.0"?>
    <reginfo xmlns="urn:ietf:params:xml:ns:reginfo"
```

-continued

```
    xmlns:feature-tag="urn:ietf:params:xml:ns:featuretaginfo"
version="0" state="full">
        <registration aor="sip:zhangsan@home.fr" id="as9"
        state="active">
            <contact id="76" state="active" event="registered">
                sip: [5555::aaa:bbb:ccc:ddd]
    <allOneLine>
            <feature-tag>g.3gpp.cs- video; g.3gpp.cs- voice</feature-tag>
</allOneLine>
<allOneLine>
            </contact>
        </registration>
    </reginfo>".
```

Step 69: After receiving the NOTIFY message, the AS returns a 200 OK response message indicating that the AS receives registration status information of the UE to the S-CSCF. The registration status information includes the capability information of the UE.

Figure 7:
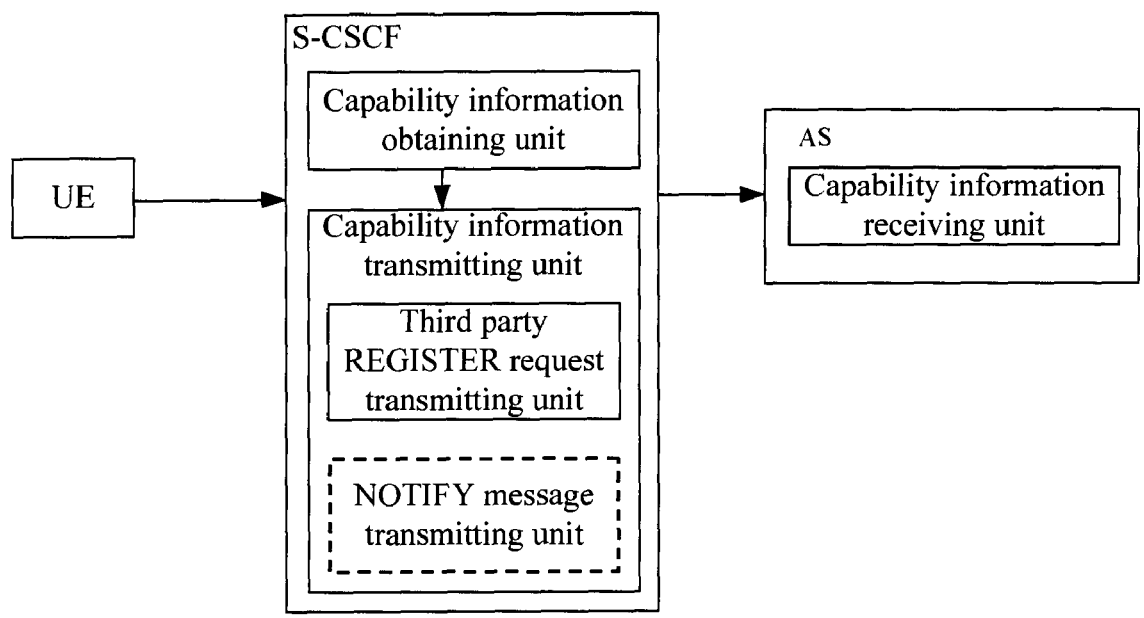
FIG. 7 is a schematic diagram illustrating the structure of a system according to an embodiment of the present disclosure.

The embodiments of the present disclosure also provide a system for obtaining UE information by an AS in the multimedia subsystem. The detailed structure of the system is shown in FIG. 7, including: a call session control function entity and an AS.

The call session control function entity is configured to receive information sent by the UE, such as a REGISTER request or a service request, obtain capability information of the UE from the information and send the capability information of the UE to an AS.

Specifically, the call session control function entity can transmit the capability information of the UE to the AS through a third party REGISTER request or a NOTIFY message.

The AS, including a capability information receiving unit, is configured to receive the capability information of the UE sent by the call session control function entity to implement corresponding services based on the capability information of the UE.

The detailed structure of the call session control function entity will be described hereinafter with reference to FIG. 7. The call session control function entity includes a capability information obtaining unit and a capability information transmitting unit.

The capability information obtaining unit is configured to obtain the capability information of the UE from the information sent by the UE and transmit the capability information of the UE to the capability information transmitting unit. Specifically, the capability information of the UE can be obtained from a message such as the REGISTER request sent by the UE; the capability information of the UE can include information regarding whether the UE supports a video service, whether the UE supports an application protocol of a certain edition, etc.

The capability information transmitting unit is configured to transmit the capability information obtained by the capability information obtaining unit to the AS and includes: a third party REGISTER request transmitting unit configured to add the capability information of the UE in a third party REGISTER request, and transmit the third party REGISTER request to the AS; or a NOTIFY message transmitting unit configured to add the capability information of the UE in a NOTIFY message and transmit the NOTIFY message to the AS.

The content can be contained in the third party REGISTER request sent by the third party REGISTER request transmitting unit in any one of following manners:

1. the capability information of the UE and the address information of the S-CSCF is contained in the Contact header field of the third party REGISTER request;

2. the capability information of the UE is contained in the Accept-Contact header field of the third party REGISTER request, and the address information of the S-CSCF is contained in the Contact header field of the third party REGISTER request;

3. the whole content of a field containing the capability information of the UE in the message received by the S-CSCF is contained in the third party REGISTER request, e.g., a corresponding message/sipfrag part is added, and the address information of the S-CSCF is contained in a newly-added Path header field of the third party REGISTER request;

4. the capability information of the UE is contained in the Contact header field of the third party REGISTER request, and the address information of the S-CSCF is contained in the newly-added Path header field of the third party REGISTER request.

In summary, the embodiments of the present disclosure ensure that the AS can receive the complete capability information of the UE, so that corresponding operations based on the capability information of the UE can be triggered on the AS (e.g., subscription, etc.). Meanwhile, the AS can also obtain the address information of the S-CSCF during the third party registration, which ensures that the AS is able to transmit the information destined to the UE through the S-CSCF.

The foregoing descriptions are exemplary embodiments of this disclosure and are not intended to be limiting. Any changes and modifications can be made by those skilled in the art without departing from the spirit of this disclosure and therefore should be covered by the scope as set forth by the appended claims.

What is claimed is:

1. A method for transmitting User Equipment (UE) information in a multimedia subsystem, comprising:
    acquiring capability information of a UE, wherein the capability information of the UE includes at least one of video capability, audio capability, text capability, software supported by the UE, and software edition supported by the UE; and
    transmitting the acquired capability information of the UE to an Application Server (AS), wherein one or more services rendered to the UE are based on the capability information;
    wherein the transmitting the capability information of the UE to the AS comprises:
    adding the capability information of the UE in a third party REGISTER request; and
    transmitting the third party REGISTER request to the AS;
    wherein the adding the capability information of the UE in the third party REGISTER request comprises:
    adding the capability information of the UE to a Contact header field of the third party REGISTER request or an Accept-Contact header field of the third party REGISTER request, or
    adding a whole content of a field containing the capability information of the UE to the third party REGISTER request; and
    wherein the third party REGISTER request further comprises address, and wherein the address information is included in a newly-added Path header field when the capability information of the UE is added to the Contact header field of the third party REGISTER request.

2. A method for transmitting User Equipment (UE) information in a multimedia subsystem, comprising:
    acquiring capability information of a UE, wherein the capability information of the UE includes at least one of video capability, audio capability, text capability, software supported by the UE, and software edition supported by the UE; and
    transmitting the acquired capability information of the UE to an Application Server (AS), wherein one or more services rendered to the UE are based on the capability information;
    wherein the transmitting the capability information of the UE to the AS comprises:
    adding the capability information of the UE in a third party REGISTER request; and
    transmitting the third party REGISTER request to the AS;
    wherein the adding the capability information of the UE in the third party REGISTER request comprises:
    adding the capability information of the UE to a Contact header field of the third party REGISTER request or an Accept-Contact header field of the third party REGISTER request, or
    adding a whole content of a field containing the capability information of the UE to the third party REGISTER request; and
    wherein the third party REGISTER request further comprises address information, and wherein the address information is included in a newly-added Path header field when the capability information of the UE is added to the Contact header field of the third party REGISTER request.

3. A non-transitory computer readable storage medium storing instructions that, when executed by a computer, cause the computer to perform a method for transmitting User Equipment (UE) information in a multimedia subsystem, the method comprising:
    acquiring capability information of a User Equipment (UE), wherein the capability information of the UE includes at least one of video capability, audio capability, text capability, software supported by the UE, and software edition supported by the UE; and
    transmitting the acquired capability information of the UE to an Application Server (AS), wherein one or more services rendered to the UE are based on the capability information;
    wherein the transmitting the capability information of the UE to the AS comprises:
    adding the capability information of the UE in a third party REGISTER request; and
    transmitting the third party REGISTER request to the AS;
    wherein the adding the capability information of the UE in the third party REGISTER request comprises:
    adding the capability information of the UE to a Contact header field of the third party REGISTER request or an Accept-Contact header field of the third party REGISTER request, or
    adding a whole content of a field containing the capability information of the UE to the third party REGISTER request;
    wherein the third party REGISTER request further comprises address information, and wherein the address information is included in a newly-added Path header field when the capability information of the UE is added to the Contact header field of the third party REGISTER request.

4. A non-transitory computer readable storage medium storing instructions that, when executed by a computer, cause the computer to perform a method for transmitting User Equipment (UE) information in a multimedia subsystem, the method comprising:
  acquiring capability information of a User Equipment (UE), wherein the capability information of the UE includes at least one of video capability, audio capability, text capability, software supported by the UE, and software edition supported by the UE; and
  transmitting the acquired capability information of the UE to an Application Server (AS), wherein one or more services rendered to the UE are based on the capability information;
  wherein the transmitting the capability information of the UE to the AS comprises:
  adding the capability information of the UE in a third party REGISTER request; and
  transmitting the third party REGISTER request to the AS;
  wherein the adding the capability information of the UE in the third party REGISTER request comprises:
  adding the capability information of the UE to a Contact header field of the third party REGISTER request or an Accept-Contact header field of the third party REGISTER request, or
  adding a whole content of a field containing the capability information of the UE to the third party REGISTER request;
  wherein the third party REGISTER request further comprises address information, and wherein the address information is included in a newly-added Path header field when the capability information of the UE is added in the Accept-Contact header field of the third party REGISTER request.

* * * * *